No. 761,036. PATENTED MAY 24, 1904.
J. M. DODGE.
CHAIN.
APPLICATION FILED APR. 5, 1904.
NO MODEL. 2 SHEETS—SHEET 1.

Witnesses:
Hamilton D. Turner
Titus H. Goss

Inventor:
James M. Dodge.
by his Attorneys,
Howson & Howson

No. 761,036. PATENTED MAY 24, 1904.
J. M. DODGE.
CHAIN.
APPLICATION FILED APR. 5, 1904.
NO MODEL. 2 SHEETS—SHEET 2.

Witnesses:
Hamilton D. Turner
Titus H. Lyons

Inventor,
James M. Dodge
by his Attorney

No. 761,036.

Patented May 24, 1904.

UNITED STATES PATENT OFFICE.

JAMES M. DODGE, OF PHILADELPHIA, PENNSYLVANIA.

CHAIN.

SPECIFICATION forming part of Letters Patent No. 761,036, dated May 24, 1904.

Application filed April 5, 1904. Serial No. 201,701. (No model.)

*To all whom it may concern:*

Be it known that I, JAMES M. DODGE, a citizen of the United States, residing in Philadelphia, Pennsylvania, have invented certain Improvements in Chains, of which the following is a specification.

The main object of my invention is to provide means for retaining the pivot-pin and the links of a chain in position laterally; and a further object of the invention is to so construct the means as to disconnect the pivot-pin from the retaining means. These objects I attain in the following manner, reference being had to the accompanying drawings, in which—

Figure 1:
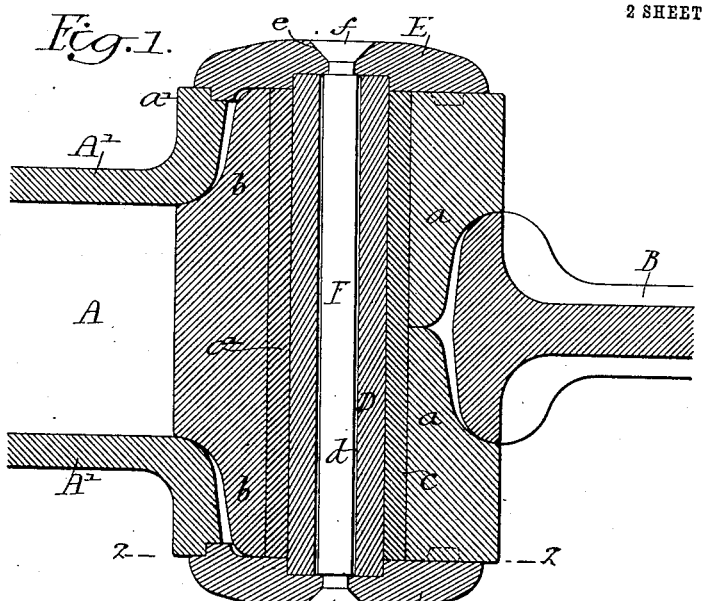
Figure 2:
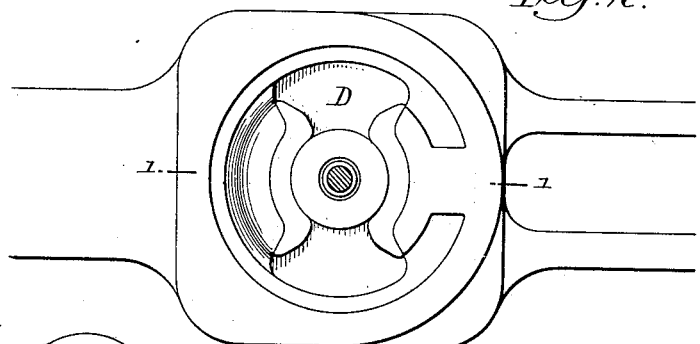
Figure 3:
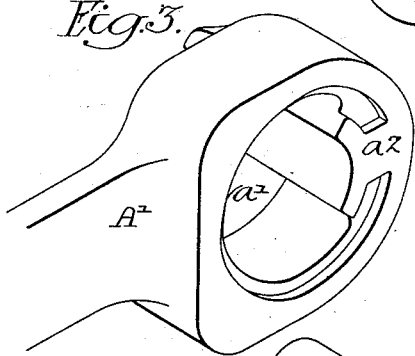
Figure 4:
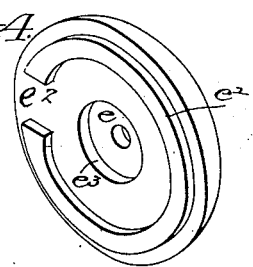
Figures 5, 6:
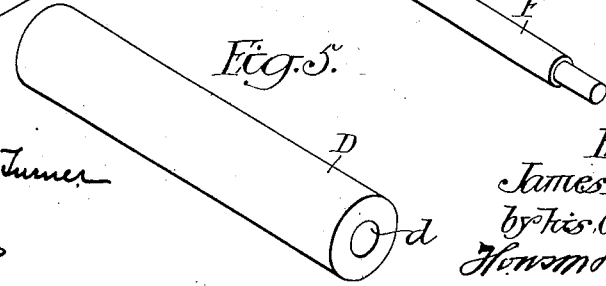
Figure 7:
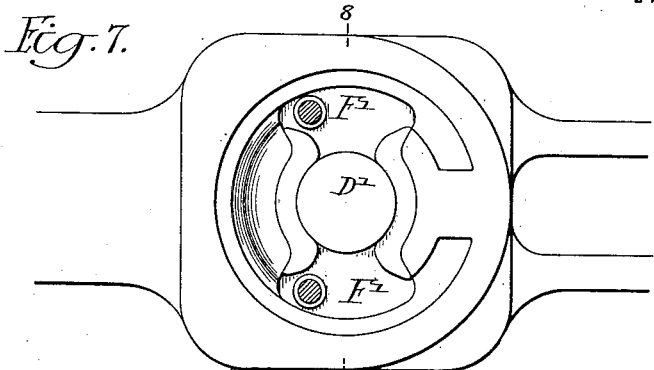
Figure 8:
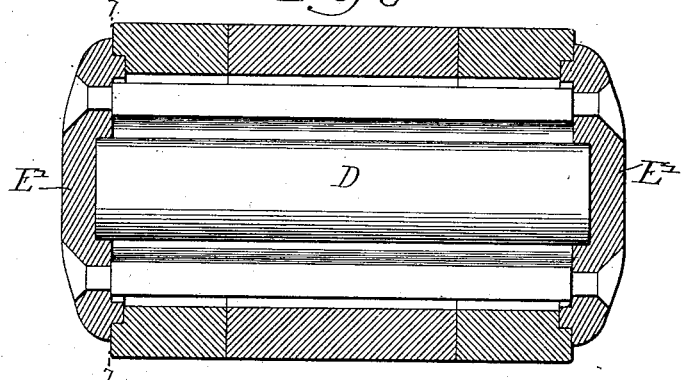
Figure 9:
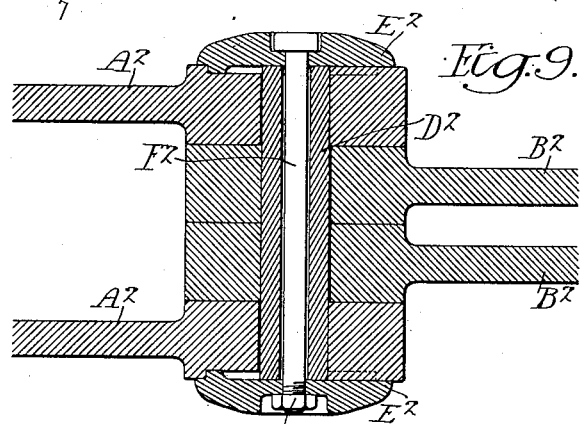
Figure 10:
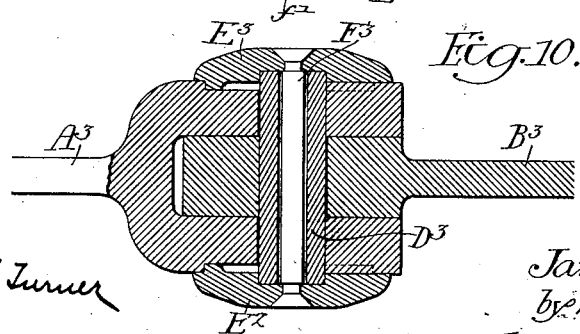

Figure 1 is a sectional plan view on the line 1 1, Fig. 2, of a chain illustrating my invention. Fig. 2 is a side view of a chain, partly in section on the line 2 2, Fig. 1. Fig. 3 is a detached perspective view of one of the links of the chain. Fig. 4 is a perspective view of one of the caps. Fig. 5 is a perspective view of the pivot-pin. Fig. 6 is a detached perspective view of the rod which passes through the pivot-pin and is attached to the caps. Fig. 7 is a section on the line 7 7, Fig. 8, illustrating a modification of my invention. Fig. 8 is a section on the line 8 8, Fig. 7. Figs. 9 and 10 are views illustrating my invention in connection with ordinary chains.

I have illustrated my invention in connection with a special form of chain which is fully illustrated and claimed in an application for patent filed by me on the 17th day of March, 1904, Serial No. 198,655.

A and B are two enchained links. B is a single link, and A is a double link consisting of two link elements $A'\ A'$. The link B has two segmental lateral projections $b\ b$, while each link element $A'$ has a segmental lateral projection $a$, as shown, forming extensions of the bearings of the links. In the present instance segmental bushings $c\ c'$ are mounted on these bearings, the bushing $c$ being mounted on the bearings of the elements of the link A, while the bushing $c'$ is mounted on the bearing of the link B.

D is a pivot-pin upon which the two links of the chain articulate.

In order to hold the link elements $A'\ A'$ in alinement with the link B and also to hold the pivot-pin laterally, I mount on each link element $A'$ a cap E. The two caps are held together by a rod F, which passes through an opening $d$ in the pivot-pin and through countersunk openings $e$ in each cap in the present instance, and the ends $f\ f$ of the rod are headed by riveting, so as to make the fastening permanent.

Each link element $A'$ has a segmental recess $a'$, into which extends a segmental rib $e'$ of the cap E. This rib is disconnected at $e^2$, so as to allow the projection $a^2$ to enter the space between the ends of the rib to lock the cap against rotary motion in respect to the link elements. Each cap is recessed at $e^3$ to accommodate the ends of the pivot-pin D. The pivot-pin, however, fits loosely within this recess, as well as loosely upon the rod F, which passes freely through the opening $d$ in the pivot-pin. By this construction the rod and its two caps turn with the link A, while the pivot-pin is free to turn independent of either link.

By the construction above described a plain pivot-pin can be used of hard metal, if desired, and may be less in diameter than pins heretofore made for the same strength of chain, as the pin is only subjected to a crushing strain. The construction of the link as shown also makes the chain perfectly balanced, although this feature does not form a part of this invention, being claimed in the application alluded to above.

In Figs. 7 and 8 I have shown a solid pivot-pin $D'$ and two rods $F'$, secured to the two caps $E'$, the rods being mounted in the space which is allowed for the free articulation of the links on the pivot-pin, the rods being so placed as not to interfere with the free movement of the links.

In Fig. 9 I have shown an ordinary chain having link elements $A^2$ and $B^2$, coupled together by a pivot-pin $D^2$. Caps $E^2$ are mounted on each end of the pivot-pin $D^2$ and overlap the link elements $A^2$, being secured together by a rod $F^2$, passing freely through the pivot-pin. In this instance the rod instead of being bolted has a head at one end and is screwthreaded at the opposite end, to which is applied a nut $f'$.

A jam-nut or cotter-pin may be used to lock the nut, or a washer and cotter-pin may be substituted for the nut, if desired.

Fig. 10 is a view showing two links $A^3$ and $B^3$, the link $A^3$ being forked to receive the end of the link $B^3$. A pivot-pin $D^3$ couples the two links together, and caps $E^3$ are used, which are tied together by a transverse rod $F^3$.

It will be understood that my invention can be applied to a simple connection of two links or may be applied to a chain in which the links are each made up of a series of link elements.

I claim as my invention—

1. The combination of two links, a pivot-pin therefor, two caps arranged to turn with one link, and a transverse tie-rod coupling the two caps, substantially as described.

2. The combination of two links, a pivot-pin therefor, two caps, a segmental flange on each cap, a projection on each side of one link entering recesses in the caps to prevent them moving independently of the said link, and a tie-rod coupling the caps, substantially as described.

3. The combination in a chain, of two links, a pivot-pin therefor, said pivot-pin having a central opening throughout its entire length, a cap at each end of the pivot-pin, a rod passing through the hole in the pivot-pin and attached to the caps, substantially as described.

4. The combination of two links, a pivot-pin therefor, said pivot-pin having an opening throughout its entire length, a cap at each end of the pivot-pin extending over one link and connected thereto so as to move therewith, and a tie-rod connecting the two caps, said hole through the pivot-pin being larger than the rod so as to allow the pivot-pin to turn independently of the rod, substantially as described.

5. The combination of two links, a pivot-pin therefor, having a central opening extending the full length of the pivot-pin, a cap at each end of the pivot-pin locked to one link so as to turn therewith, a tie-rod extending freely through the opening in the pivot-pin and through openings in the caps, and having a riveted head at each end thereof, substantially as described.

6. The combination of two links, a pivot-pin therefor, a cap at each end of the pivot-pin, each cap recessed for the reception of the pivot-pin, and means by which each cap is locked to one of the links, and a transverse tie-rod coupling the two caps, substantially as described.

7. The combination in a chain, of two links, one link being made up of two elements placed outside of the other link, a cap mounted on each element and locked thereto, a pivot-pin extending from one cap to the other, and a transverse tie-rod coupling the two caps, substantially as described.

In testimony whereof I have signed my name to this specification in the presence of two subscribing witnesses.

JAMES M. DODGE.

Witnesses:
WILL. A. BARR,
JOS. H. KLEIN.